(12) United States Patent
Moessinger et al.

(10) Patent No.: US 7,094,343 B2
(45) Date of Patent: Aug. 22, 2006

(54) FILTER DEVICE

(75) Inventors: Klaus Moessinger, Obersulm-Willsbach (DE); Klaus Deschner, Oestringen (DE); Norbert Breusch, Sinsheim (DE)

(73) Assignee: ARGO-HYTOS GmbH, Kraichtal (DE)

(*) Notice: Subject to any disclaimer, the term of this patent is extended or adjusted under 35 U.S.C. 154(b) by 68 days.

(21) Appl. No.: 10/413,503

(22) Filed: Apr. 14, 2003

(65) Prior Publication Data

US 2004/0031745 A1 Feb. 19, 2004

Related U.S. Application Data

(63) Continuation of application No. PCT/EP00/10258, filed on Oct. 18, 2000.

(51) Int. Cl.
*B01D 35/16* (2006.01)

(52) U.S. Cl. .................. 210/298; 210/299; 210/323.2; 210/407; 210/450; 210/454

(58) Field of Classification Search ........... 210/168, 210/299, 323.2, 332, 396, 407, 440, 450, 210/454, 457, 493.2, 497.01, 298, 438, 458; 277/918
See application file for complete search history.

(56) References Cited

U.S. PATENT DOCUMENTS

| | | | |
|---|---|---|---|
| 1,840,312 A | | 1/1932 | Dunmire |
| 2,356,947 A | | 8/1944 | Pranger et al. |
| 4,090,962 A | | 5/1978 | Braukmann |
| 4,108,775 A | * | 8/1978 | Wilkes et al. .............. 210/169 |
| 4,702,790 A | * | 10/1987 | Hogh et al. ................ 156/293 |
| 5,141,637 A | * | 8/1992 | Reed et al. ................ 210/232 |
| 5,378,363 A | | 1/1995 | Christophe et al. |
| 5,484,466 A | | 1/1996 | Brown et al. |
| 5,718,825 A | * | 2/1998 | Greive et al. .............. 210/298 |
| 5,902,361 A | | 5/1999 | Pomplun et al. |
| 6,068,763 A | * | 5/2000 | Goddard .................... 210/130 |
| 6,555,000 B1 | * | 4/2003 | Knight ..................... 210/416.4 |
| 2002/0170852 A1 | * | 11/2002 | Reinhardt ................. 210/132 |

FOREIGN PATENT DOCUMENTS

| | | |
|---|---|---|
| DE | 35 38 589 | 5/1987 |
| DE | 41 24 323 | 1/1993 |
| DE | 43 22 226 | 1/1995 |
| DE | 195 38 883 | 4/1997 |
| DE | 197 18 603 | 11/1997 |

(Continued)

*Primary Examiner*—Matthew O. Savage
(74) *Attorney, Agent, or Firm*—Lipsitz & McAllister, LLC

(57) ABSTRACT

The invention relates to a filter device (10) for filtering a liquid, in particular a hydraulic oil, having a substantially cylindrical filter housing (12), which accommodates a filter element (30) and can be closed off by means of a cover (18), the filter element (30) having an associated untreated region (70) with an inlet (22) for supplying liquid which is to be filtered and a clean region (74) with an outlet (26) for removing filtered liquid, and the filter element (30) comprising an end plate (58) which is remote from the cover (18) and on which there is mounted a radially acting sealing element (62) for sealing the untreated region (70) of the filter element (30). To develop a filter device of this type in such a manner that it can be produced at lower cost and can be assembled more easily, according to the invention it is proposed that the sealing element (62) comprises a radially protruding sealing lip (64) which bears against the inner side of the filter housing (12) and is inclined toward the untreated region (70) of the filter element (30).

17 Claims, 1 Drawing Sheet

FOREIGN PATENT DOCUMENTS

| | | |
|---|---|---|
| DE | 297 23 508 | 4/1999 |
| DE | 198 26 032 | 12/1999 |
| EP | 375373 A2 * | 6/1990 |
| EP | 0 662 337 | 7/1995 |
| EP | 0 733 840 | 5/2000 |
| EP | 1 031 367 | 8/2000 |
| WO | 97/41939 | 11/1997 |

* cited by examiner

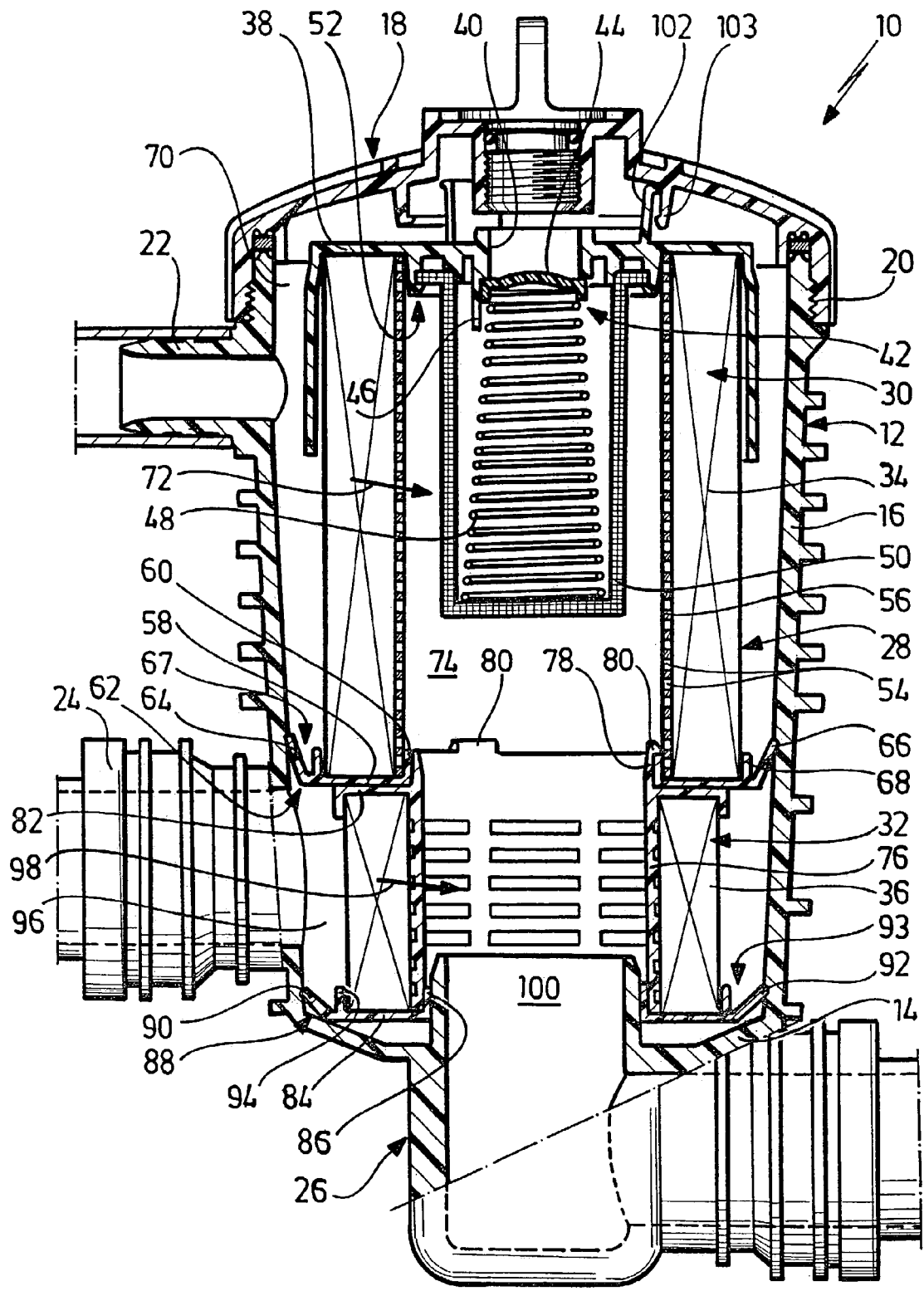

FILTER DEVICE

The present invention relates to the subject matter disclosed in International patent application No. PCT/EP00/10258 of Oct. 18, 2000, which is incorporated herein by reference in its entirety and for all purposes.

BACKGROUND OF THE INVENTION

The invention relates to a filter device for filtering a liquid, in particular a hydraulic oil, having a substantially cylindrical filter housing, which accommodates a filter element and can be closed off by means of a cover, the filter element having an associated untreated region with an inlet for supplying liquid which is to be filtered and a clean region with an outlet for removing filtered liquid, and the filter element comprising an end plate which is remote from the cover and on which there is mounted a radially acting sealing element for sealing the untreated region of the filter element.

Filter devices of this type are used, for example, to filter mineral oils in hydraulic systems. In this case, the hydraulic systems have to satisfy very high demands with regard to the hydraulic oil being clean, so that they can fulfill their function without faults and with little wear over prolonged operating times. Since the filter element gradually becomes blocked with dirt particles during the operating time, it is usually mounted exchangeably in the filter housing. The sealing element mounted on the end plate ensures that the unfiltered hydraulic oil fed to the untreated region cannot bypass the filter element inside the filter housing, but rather the untreated region is reliably sealed. O-ring seals which are held against the end plate are customarily used for this purpose. For this purpose, the end plate usually comprises an O-ring groove for accommodating the O-ring.

In DE 197 18 603 A1, it is proposed for a sealing lip, which is pressed onto a corresponding sealing surface by means of a clamping ring, to be formed onto the end plate of the filter element. The clamping ring exerts a compressive load on the sealing lip, so that the sealing action which is required for the filter device to operate is ensured. In addition to the use of the clamping ring, it is in this case proposed for the sealing lip to have two sections which are oriented obliquely with respect to one another and in their transition region form a sealing edge for bearing against a sealing surface. Therefore, the sealing element has a configuration of complex construction, and when the filter element is being exchanged, careful attention must be paid to ensuring that the clamping ring exerts on the sealing lip the compressive force which is required in order to produce a seal.

It is an object of the present invention to develop a filter device of the generic type in such a manner that it can be produced at lower cost and the filter element can be assembled more easily.

SUMMARY OF THE INVENTION

In a filter device of the type described in the introduction, this object is achieved, according to the invention, through the fact that the sealing element comprises a radially protruding flexible sealing lip which bears against the inner side of the filter housing and is inclined toward the untreated region of the filter element.

In the device according to the invention, the sealing element protrudes radially outward beyond the end plate, and the flexible sealing lip bears against the inner side of the filter housing. The flexible sealing lip, when the filter element is outside of the filter housing, has an outer diameter which is larger than an inner diameter of the filter housing, at least in a region of the inner side portion of the housing that the sealing lip bears against when inserted into the housing. As a result, the filter element, when it is inserted into the filter housing, is centered as a result of the sealing lip bearing against the inner side of the filter housing, so that insertion of the filter element is simplified. Moreover, the sealing lip is inclined in the direction of the untreated region of the filter element Surprisingly, it has been found that an inclination of this nature ensures a reliable sealing action even if no additional clamping element is used to exert a compressive load on the sealing lip. Rather, the compressive load which is required in order to produce a reliable sealing action is ensured during operation as a result of the pressure drop which is established at the filter element. The pressure difference between the untreated region and the clean region of the filter element leads to a compressive load, which is oriented radially outward in the direction of the wall of the filter housing, being exerted on the flexible sealing lip, which is directed obliquely toward the untreated region, so that the flexible sealing lip bears tightly against the inner side of the filter housing and reliably seals the untreated region of the filter element in the axial direction.

It is particularly advantageous if the free end of the sealing lip, when the filter element is being removed from the filter housing, scrapes along the inner side of said housing at least along a partial region which extends in the axial direction. This makes it possible to ensure, in a structurally simple manner, that dirt particles which are deposited on the inner side of the filter housing while the filter device is operating are stripped off this wall. Therefore, when the filter element is being exchanged, the inner side of the filter housing is cleaned at the same time, without additional cleaning measures having to be carried out for this purpose. The sealing element therefore has a dual function, in that on the one hand it reliably seals the untreated region of the filter element and on the other hand it forms a stripper element for cleaning the inner side of the filter housing when the filter element is being exchanged. In this context, it is favorable if the free end of the sealing lip, when the filter element is being exchanged, scrapes along the entire inner side of the filter housing in the axial direction. However, a significant cleaning action is achieved even if the free end of the sealing lip only scrapes along that region of the inner side of the filter housing which adjoins the end plate in the installed position of the filter element, since particularly high levels of dirt are produced in this region while the filter device is operating.

It is advantageous if the filter housing widens conically in the direction of the cover. This has the advantage that the insertion of the filter element with radially protruding sealing lip is simplified and that during removal of the filter element that region of the filter housing which is disposed adjacent to it in the installed position of the end plate is subject to a particularly strong stripping action. As has been explained above, it is precisely in this region that increased levels of dirt particles accumulate while the filter device is operating.

In a particularly preferred embodiment, it is provided that the sealing element forms a collection space for receiving dirt particles which are deposited during removal of the filter element. With a configuration of this type, the risk of dirt particles being able to enter the clean region from the untreated region when the filter element is being removed is greatly reduced. Rather, the dirt particles are deposited in the collection space of the sealing element and can be disposed of together with the clogged filter element.

Preferably, the sealing lip is configured in the form of a channel, with the free end region of the sealing lip facing the cover. The sealing lip thereby forms an annular collection space, which surrounds the filter element in the peripheral direction, for receiving dirt particles which are deposited and is inclined in the direction of the untreated region of the filter element.

It is particularly favorable if the sealing element is of substantially V-shaped construction, having a first limb which extends from the outer edge of the end plate to the inner side of the surrounding filter housing, and having a second limb, which forms a holding ring which is oriented substantially coaxially with respect to the longitudinal axis of the filter housing and surrounds a filter material, which is disposed in the form of a hollow cylinder, of the filter element in the peripheral direction. The holding ring supports the filter material, which is preferably folded in a star shape, in the radial direction, while the first limb, which is oriented obliquely with respect to the holding ring, of the sealing element forms a sealing lip which bears against the inner side of the filter housing.

In a particularly preferred embodiment, it is provided that sealing element and the end plate are made from plastics. In this case, it is particularly advantageous if the sealing element and the end plate are connected integrally to one another, since in this way the production costs can be greatly reduced.

The filter housing and the cover are preferably made from plastics. In this case, it is advantageous if the filter housing, on its outer side, has radially protruding reinforcing ribs, since in this way a filter device which can withstand even relatively high pressures can be formed in a way which is inexpensive to produce.

In a particularly preferred embodiment of the invention, it is provided that an additional filter element, which has associated with it a separate untreated region with an inlet for the liquid which is to be filtered, is disposed on that side of the end plate which is remote from the cover, the sealing element mounted on the end plate sealing the untreated region associated with the filter element with respect to the untreated region associated with the additional filter element. A configuration of this type makes it possible for the filter device to be used simultaneously as both a suction filter and a return filter. For this purpose, it is possible to provide for the filter element to have a higher filter fineness than the additional filter element and for the filter device to comprise a common outlet for the filter element and for the additional filter element. On the entry side, the additional filter element may be fed, for example, with hydraulic oil which is to be filtered from an oil reservoir, and this oil is filtered by the additional filter element and fed via the outlet to a pump, for example. At the same time, the filter element is fitted into a return line of the hydraulic system, the inlet associated with the filter element being connected to a working element of the hydraulic system, and it being possible for the filtered hydraulic oil likewise to be fed to the pump, via the common outlet of the filter device. The sealing element disposed at the end plate of the filter element in this case reliably ensures that the untreated region of the filter element is sealed with respect to the untreated region of the additional filter element.

It is particularly expedient if the additional filter, on its end side which is remote from the cover, carries a closure plate, on which a further sealing element is mounted, having a sealing lip which bears against the inner side of the filter housing and is inclined in the direction of the untreated region associated with the additional filter element. A configuration of this type is distinguished by the use of a total of two sealing elements which protrude radially from the end plate of the filter element and from the closure plate of the additional filter element and each bear against the inner side of the filter housing. While the sealing element which is held against the end plate separates and seals the untreated regions of the filter element and of the additional filter element from one another, the sealing element disposed at the closure plate of the additional filter element ensures that the untreated region of the additional filter element is sealed off from its clean region.

To achieve particularly simple assembly, the filter element and the additional filter element can be fitted onto one another in the axial direction. In this context, it is advantageous if the filter element and the additional filter element can be latched together. It is possible to provide that the additional filter element and the filter element can be non-releasably connected to one another.

Exchanging of the filter element can be simplified through the fact that the filter element can be releasably connected to the cover by means of a latching connection. This opens up the possibility of removing a clogged filter element from the filter housing together with the cover and then releasing the clogged filter element from the cover. It is then possible for a new filter element to be connected to the cover by means of the latching connection and inserted into the filter housing.

The following description of a preferred embodiment of the invention is used for further explanation in conjunction with the drawing.

BRIEF DESCRIPTION OF THE DRAWING

A filter device is shown in the single FIGURE in a schematic longitudinal section.

DETAILED DESCRIPTION OF THE INVENTION

The filter device, which is denoted by reference numeral 10, comprises a substantially cylindrical filter housing 12 having a base 14 and a housing shell 16. On its top edge, which is remote from the base 14, a cover 18 can be fitted onto the filter housing 12, with a sealing ring between them, and can be releasably connected to the filter housing 12 by means of a screw connection 20. A radially protruding first inlet stub 22 is formed integrally on the housing shell 16, adjacent to the cover 18, and a radially protruding second inlet stub 24 is formed integrally on the housing shell 16, adjacent to the base 14, while a single outlet stub 26 is formed integrally on the base 14.

The filter housing 12 accommodates a combination filter element 28, which has a first filter element 30, adjacent to the cover 18, and a second filter element 32, adjacent to the base 14. The two filter elements 30 and 32 are fitted on to one another in the axial direction and each comprise a filter material 34 and 36, respectively, which is folded in a star shape in the usual way. The filter material 34 of the first filter element 30 has a higher filter fineness than the filter material 36 of the second filter element 32. By way of example, the filter material 34 used for the first filter element 30 may be a fiber nonwoven with a fineness which is such that even dirt particles with a size of approx. 5 µm can still be filtered out with an efficiency of at least 50%. By contrast, the filter material 36 of the second filter element 32 is configured to be coarser, for example it may be in the form of a screen element with a filter fineness of at least approximately 60 µm.

On its end side which faces the cover 18, the filter material 34 of the first filter element 30 carries an end cap 38 with a central through-bore 40, at which a bypass valve 42 is mounted. The bypass valve 42 comprises a valve disc 44, which is mounted in such a manner that it can be displaced in the axial direction in a valve guide 46 connected integrally to the end cap 38 and which is spring-loaded in the direction of its closed position by means of a compression spring 48.

The compression spring 48 is supported, by means of its end side which is remote from the valve disc 44, on a screen housing 50, which is held on the end cap 38 by means of a latching connection 52.

The filter material 34, which is disposed in the form of a hollow cylinder, of the first filter element 30 is supported in the radial direction against a support tube 56 which has a multiplicity of through-bores 54.

On its end side remote from the cover 18, the first filter element 30 carries an end plate 58 which is in the form of a circular ring, on its inner edge region carries a support ring 60 which is oriented coaxially with respect to the longitudinal axis of the filter housing 12, and which, like the filter housing 12, the cover 18 and the end cap 38, is made from plastics.

At its outer edge, the end plate 58 carries a sealing element 62, which is connected integrally to the end plate 58 and is substantially V-shaped in configuration, having a first limb, which forms a sealing lip 64 and is oriented obliquely with respect to the longitudinal axis of the filter housing 12, so that a free end region 66 of the sealing lip 64, facing the cover 18, bears against the inner side of the housing shell 16, and having a second limb, which forms a holding ring 68 oriented coaxially with respect to the support ring 60 and surrounds the filter material 34 in the peripheral direction in its end region which faces the end plate 58.

Hydraulic oil which is to be filtered can be fed via the first inlet stub 22 to an annular space which surrounds the first filter element 30 in the peripheral direction and forms an untreated region 70 associated with the first filter element 30. From this region, the hydraulic oil flows through the first filter element 30 in the radial direction from the outside inward, as indicated by the arrow 72, and then passes into the clean region 74, which is surrounded by the filter material 34, of the filter element 30.

Since the filter material 34 of the first filter element becomes clogged while the filter is operating, the result is an increasing pressure drop at the first filter element 30. The result of this is that when a predetermined differential pressure value is reached, the bypass valve 42 opens and as a result a direct flow connection from the untreated region 70 to the clean region 74 is opened up. The untreated region 70 is delimited in the axial direction by the sealing element 62. In this case, the unfiltered hydraulic fluid which is present in the untreated region 70 exerts a compressive load on the sealing lip 64 inclined in the direction of the untreated region 70. The sealing lip 64 is comprised of a flexible material and has an outer diameter which is larger than an inner diameter of the filter housing 12 when the filter element 30 is outside of the filter housing 12, at least in a region of the inner side portion of the housing 12 that the sealing lip 64 bears against when inserted into the housing 12. As a result of the compressive load, the sealing lip 64 is pressed radially outward onto the inner side of the housing shell 16. This leads to reliable sealing of the untreated region 70.

The second filter element 32 is oriented coaxially with respect to the first filter element 30 and comprises a supporting tube 76 for supporting the filter material 36. The supporting tube 76 is likewise made from plastics and comprises a collar-like projection 78, facing the first filter element 30, which can be introduced into the supporting ring 60 and can be latched to the supporting ring 60 by means of integrally formed latching tongues 80.

A cover plate 82, which bears against the end plate 58 and covers the upper end side, facing the first filter element 30, of the filter material 36, is formed integrally on the support tube 76. On that end side of the filter material 36, disposed in the form of a hollow cylinder, which is remote from the first filter element 30, there is a closure plate 84 which is in the form of an annular ring, carries, at its inner edge, a supporting ring 86, which is oriented coaxially with respect to the longitudinal axis of the filter housing 12 and is likewise made from plastics. A sealing element 88 is formed integrally on the outer edge of the closure plate 84, which sealing element 88 is of substantially V-shaped configuration, so as to match the sealing element 62, having a first limb, which is oriented obliquely with respect to the longitudinal axis of the filter housing 12 and forms a sealing lip 90, the free end region 92 of which, facing the cover 18, bears against the inner side of the housing shell 16, and having a second limb, which forms a holding ring 94 which is oriented coaxially with respect to the longitudinal axis of the filter housing 12, and surrounds the filter material 36 in the peripheral direction.

In a corresponding way to the first filter element, the second filter element 32 is also disposed at a spacing from the housing shell 16, so that an annular untreated region 96, to which, by way of example, hydraulic oil which is to be filtered can be fed via the second inlet stub 24, is formed between the housing shell 16 and the filter material 36. This filter oil flows through the filter material 36 in the radial direction from the outside inward, as indicated by the arrow 98, and as a result passes into the clean region 100, which is surrounded by the filter material 36, is in flow communication with the clean region 74 of the first filter element 30 via the projection 78 and from which the filtered hydraulic oil can be discharged via the outlet stub 26.

By way of example, a pump can be connected to the outlet stub 26, while the first inlet stub 22 is in communication with a working element of a hydraulic system and the second inlet stub 24 is connected to a reservoir vessel for hydraulic oil. This provides the option of using the filter device 10 as a combined return-suction filter. In this case, the sealing element 62 ensures that the untreated region 70 of the first filter element is sealed with respect to the untreated region 96 of the second filter element 32 without additional clamping elements having to be used for this purpose. The same is true of the use of the sealing element 88, which seals the untreated region 96 of the second filter element with respect to its clean region 100.

For exchange purposes, the combination filter element 32 can be removed from the filter housing 12 as a result of the screw connection 20 being released and the cover 18 being removed. The combination filter element 28 is in this case releasably connected to the cover 18 by means of latching tongues 102, 103 which are integrally connected to the end cap 38 or to the cover 18 and engage behind one another.

When the combination filter element 28 is being removed from the filter housing 12, the sealing lips 64 and 90 scrape along the inner side of the housing shell 16, and dirt particles which become detached from the inner side of the housing shell 16 are received by the space 67 between the sealing lip 64 and the supporting ring 60 and the space 93 between the sealing lip 90 and the supporting ring 86. The spaces 67 and 93 therefore each form a collection space for dirt particles, so that they can be removed from the filter housing 12 and disposed of together with the combination filter element 28.

The invention claimed is:

1. Filter device for filtering a liquid, comprising:
a substantially cylindrical filter housing which can be closed off by means of a cover;
a filter element adapted for insertion into said filter housing;
an inlet for supplying liquid which is to be filtered to an untreated region of the filter device;
an outlet for removing filtered liquid from a clean region of the filter device;
the filter element comprising an end plate which is remote from the cover for receiving filter material of said filter element;
a radially acting sealing element for sealing the untreated region of the filter element, the sealing element comprising a radially protruding flexible sealing lip extending from said end plate and inclined toward the untreated region of the filter device, said sealing lip bearing against an inner side portion of the filter housing when said filter element is inserted into said housing, and said sealing lip having an outer diameter which is larger than an inner diameter of said filter housing at least in a region of said inner side portion when said filter element is outside of said filter housing.

2. Filter device according to claim 1, wherein a free end of the sealing lip, when the filter element is being removed from the filter housing, scrapes along the inner side of said housing at least along a partial region which extends in the axial direction.

3. Filter device according to claim 2, wherein the filter housing widens conically in the direction of the cover.

4. Filter device according to claim 1, wherein the sealing element forms a collection space for receiving dirt particles which are deposited during removal of the filter element from the filter housing.

5. Filter device according to claim 1, wherein the sealing element is configured in the form of a channel, with a free end of the sealing lip facing the cover.

6. Filter device according to claim 1, wherein the sealing element and the end plate are made from plastics.

7. Filter device according to claim 1, wherein the sealing element and the end plate are connected integrally to one another.

8. Filter device according to claim 1, wherein the filter housing and the cover are made from plastics.

9. Filter device according to claim 1, further comprising:
an additional filter element, and
a second inlet for supplying the liquid which is to be filtered by said additional filter element to a separate untreated region of the filter device,
said additional filter element being disposed on a side of the end plate which is remote from the cover,
the sealing element extending from the end plate sealing the untreated region associated with the filter element with respect to the separate untreated region associated with the additional filter element.

10. Filter device according to claim 9, wherein the additional filter element, on its end side which is remote from the cover, carries a closure plate, on which a further sealing element is mounted, said further sealing element having a flexible sealing lip extending from said closure plate and inclined toward the untreated region of the filter device associated with the additional filter element, said sealing lip bearing against a second inner side portion of the filter housing when said filter element is inserted into said housing, and said sealing lip having an outer diameter which is larger than an inner diameter of said filter housing at least in a region of said second inner side portion when said filter element is outside of said filter housing.

11. Filter device according to claim 9, wherein the filter element and additional filter element are configured to be fitted onto one another in the axial direction.

12. Filter device according to claim 9, wherein the filter element and the additional filter element are connectable together by a latching connection.

13. Filter device according to claim 1, wherein the filter element can be releasably connected to the cover by means of a latching connection.

14. Filter device according to claim 1, wherein a pressure differential between the treated and untreated regions of the filter element creates a compressive load which forces said sealing lip against said inner side portion of the filter housing, thereby enhancing said sealing of said untreated region.

15. Filter device according to claim 1, wherein:
said inner diameter of said filter housing widens conically in a direction of said cover.

16. Filter device according to claim 15, wherein said filter element is removable with said cover.

17. Filter device according to claim 15, wherein a free end of the sealing lip, when the filter element is being removed from the filter housing, scrapes along the inner side of said housing at least along a partial region of the housing which extends in the axial direction.

* * * * *